US008036819B2

(12) United States Patent
Bleil et al.

(10) Patent No.: US 8,036,819 B2
(45) Date of Patent: Oct. 11, 2011

(54) INTERNAL COMBUSTION ENGINE FOR VEHICLES, IN PARTICULAR A DIESEL ENGINE

(75) Inventors: Andreas Bleil, Ludwigsburg (DE); Martin Blanc, Knittlingen (DE); Toedter Olaf, Wössingen (DE)

(73) Assignee: BERU Aktiengesellschaft, Ludwigsburg (DE)

( * ) Notice: Subject to any disclaimer, the term of this patent is extended or adjusted under 35 U.S.C. 154(b) by 575 days.

(21) Appl. No.: 11/709,958

(22) Filed: Feb. 23, 2007

(65) Prior Publication Data

US 2007/0203636 A1 Aug. 30, 2007

(30) Foreign Application Priority Data

Feb. 24, 2006 (DE) ......................... 10 2006 008 759

(51) Int. Cl.
*G06F 19/00* (2006.01)
*F02D 41/02* (2006.01)

(52) U.S. Cl. ......................... 701/115; 701/102; 711/103

(58) Field of Classification Search .......... 701/101–105, 701/111, 113–115; 711/100–103; 123/480, 123/486, 145 A, 478
See application file for complete search history.

(56) References Cited

U.S. PATENT DOCUMENTS

| | | | | |
|---|---|---|---|---|
| 4,394,742 | A * | 7/1983 | Crummer et al. | 701/102 |
| 4,862,370 | A * | 8/1989 | Arnold et al. | 701/113 |
| 5,575,264 | A | 11/1996 | Barron | |
| 5,608,657 | A * | 3/1997 | Conway et al. | 702/183 |
| 5,838,075 | A * | 11/1998 | Yamasaki | 307/10.3 |
| 6,048,193 | A * | 4/2000 | Juntunen et al. | 431/6 |
| 6,119,064 | A * | 9/2000 | Nakaguro et al. | 701/115 |
| 6,292,741 | B1 * | 9/2001 | Bitzer et al. | 701/115 |
| 6,560,528 | B1 * | 5/2003 | Gitlin et al. | 701/115 |
| 6,728,610 | B1 * | 4/2004 | Marshall et al. | 701/30 |
| 6,735,514 | B2 * | 5/2004 | Pepi et al. | 701/114 |
| 6,799,106 | B2 | 9/2004 | Fukushima et al. | |
| 6,961,650 | B2 * | 11/2005 | Itoh | 701/104 |
| 7,006,914 | B1 * | 2/2006 | Cahoon | 701/115 |
| 7,047,128 | B2 * | 5/2006 | Dudel et al. | 701/115 |
| 7,110,830 | B2 * | 9/2006 | Weber et al. | 700/5 |
| 7,129,819 | B2 * | 10/2006 | Chiavetta et al. | 340/309.16 |
| 7,145,485 | B2 | 12/2006 | Mizusawa | |
| 7,319,925 | B2 * | 1/2008 | Gisy et al. | 701/29 |
| 2006/0116797 | A1 * | 6/2006 | Moran | 701/22 |

FOREIGN PATENT DOCUMENTS

| | | | |
|---|---|---|---|
| DE | 10117809 | A1 | 10/2002 |
| DE | 10312914.6 | | 3/2003 |
| DE | 10352033 | A1 | 6/2005 |
| EP | 1026384 | A1 | 8/2000 |
| EP | 1400674 | A2 | 7/2003 |
| EP | 1719897 | A | 5/2005 |
| WO | 2002/099492 | | 12/2002 |

* cited by examiner

*Primary Examiner* — Willis Wolfe, Jr.
*Assistant Examiner* — Johnny Hoang

(57) ABSTRACT

The invention relates to an internal combustion engine for vehicles on which a device is mounted and has a semiconductor-based read-only memory, which contains data which are destined to be used for a given purpose of the device, and has an interface enabling an access to the read-only memory. In addition to the data which are destined to be used for the given purpose of the device there are engine-specific data stored in non-volatile manner in the device, the engine-specific data being neither necessary nor destined for the given purpose of the device, and that the engine-specific data, too, can be read out electronically via the said interface.

14 Claims, 1 Drawing Sheet

INTERNAL COMBUSTION ENGINE FOR VEHICLES, IN PARTICULAR A DIESEL ENGINE

Figure 1:
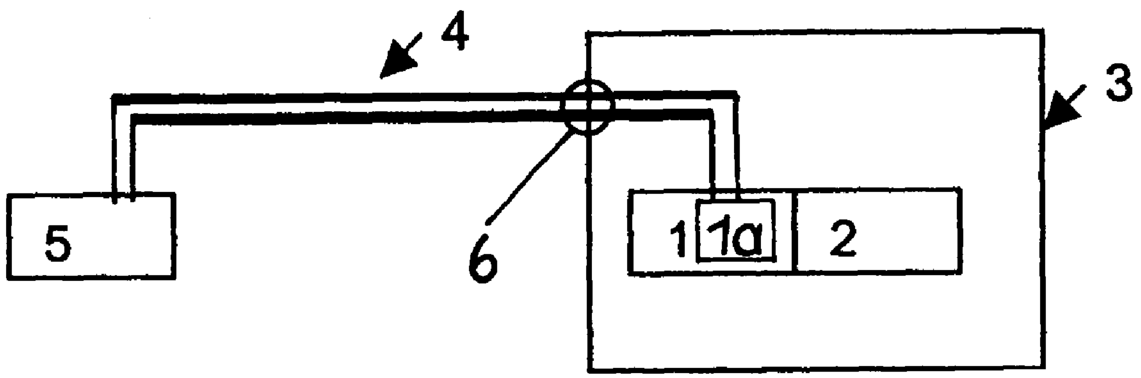

The present invention relates to an internal combustion engine for vehicles provided with a data carrier for engine-specific data that is attached to the engine during the production process for being read at some later time.

It has been known to print engine-specific data on labels, for example in the form of a bar code, and to stick up the labels on the engine block. However, it is a disadvantage that the engines frequently leave the production process with an oily surface so that the labels will not stick very well and may get lost. It has been further known to print the engine-specific data on labels and to hang them up on the engine. However, in this case there is a risk of the labels being torn off.

Further, it has been known to emboss a series number of the engine into the engine block. However, this is costly and suited only for very small data volumes.

DE 101 17 809 A1 discloses to store parameters of fuel injectors for a common-rail system of a Diesel engine in an integrated circuit provided in the head of the respective injectors and to transfer the parameters from there to a control unit, which controls the process of injecting the Diesel fuel into the engine. For this purpose also the control unit comprises an IC reading out the data from the ICs in the injectors.

Now, it is the object of the present invention to open up a way of storing more engine-specific data than merely an engine series number on the engine in a permanently useful way while avoiding the before-mentioned disadvantages and particular efforts as well.

This object is achieved by an internal combustion engine for vehicles on which a device is mounted comprising a semiconductor-based read-only memory, which contains data which are destined to be used for a given purpose of the device, and comprising an interface enabling an access to the read-only memory. In addition to the data which are destined to be used for the given purpose of the device, according to the invention there are engine-specific data stored in non-volatile manner in the device, the engine-specific data being neither necessary nor destined for the given purpose of the device, and the engine-specific data, too, can be read out electronically via the said interface.

It is also claimed to use a device or a control device, respectively, mounted on an internal combustion engine for vehicles, the device having a given purpose and comprising a semiconductor-based read-only memory in which there are stored data which are destined for said given purpose and can be read out electronically via an interface. Such a device or control device, respectively, is now for the first time used for an additional purpose by additionally storing in non-volatile manner engine-specific data, which are neither required nor destined for said given purpose of the device or control device, resp.

The invention provides essential advantages:

Without or without notable extra expense additional data can be stored in the read-only memory, which is already provided on the engine, namely engine-specific data which hitherto had been stored in a different manner, e.g. on labels. According to the invention an additional function is assigned to a read-only memory which is already present on the engine.

The demands the read-only memory has to meet are so low as to permit the use of a low-cost read-only memory.

The space requirements for the read-only memory are small or even zero.

The read-only memory can store a great number of data.

The engine-specific data will be present, and can be read out, at any time during the entire service life of the engine.

After installation of the engine in the vehicle, the read-only memory can be continuously connected, via its interface, with a device suited for reading out the read-only memory, especially with an engine control unit.

Transmission errors and reading errors can be excluded.

The engine-specific data can be stored in a separate read-only memory in the device mounted on the engine. Preferably the engine-specific data are stored in the same read-only memory which contains also those data, which are destined to the used for the given purpose of the device. Practically this does not require additional efforts.

The invention is of particular advantage for Diesel engines. Diesel engines have glow plugs and an electronic control device for controlling the glow plugs, which is mounted on the engine preferably in the direct neighborhood of the glow plugs. The read-only memory that contains the engine-specific data preferably is part of such a control device for glow plugs of the Diesel engine. The cost and effort necessary in this case for storing the engine-specific data is extremely small as the glow plug control device as such can be used to simultaneously store the engine-specific data.

The engine-specific data to be possibly stored in the read-only memory include especially the data needed by an electronic control unit used for controlling the operation of the engine, in particular data that are subject to tolerances resulting from the production process and that may vary between one engine and the next and, for a single engine, between one cylinder and the next, but which should be precisely known to the electronic engine control unit to permit optimum control of the engine operation. Such data are obtained by measurements carried out on the respective engine or on parts thereof, and will be called hereafter as calibration data. Frequently, it is not possible to transfer the calibration data, obtained during production of the engine, to the electronic engine control unit immediately because the control unit does not yet exist or is not yet ready for operation at the time of calibration of the engine. In that case, the calibration data have to be entered into the electronic engine control unit at a later time, frequently at a place remote from the place the calibration was carried out. Using the invention, this is now possible without any problem. The data can be taken over by the engine control unit automatically, and it is in any case ensured that data relating to the correct engine are transferred, free from any errors, by direct data transfer from the read-only memory mounted on the engine to the electronic engine control unit. Man is excluded as a "source of error" in connection with the transfer of data. In case a failure of the engine control unit should occur at some later time, or if data should be lost from the engine control unit or that the engine control unit has to be replaced, then the data contained in the read-only memory mounted on the engine can be transferred again and again without any problem.

Particular advantages are achieved if the invention is applied to a common-rail Diesel engine having injectors for injecting Diesel fuel into the engine. The injectors are supplied with fuel at a pressure in the range of 2000 bars (corresponding to $2 \cdot 10^8$ N/m$^2$) so that the fuel injection system is very sensitive to production tolerances of the injectors. The engine control unit of the common-rail Diesel engine therefore is especially dependent on trimming data of the injectors. Consequently, it is of advantage if the trimming data of the injectors are entered into the read-only memory, which is anyway provided according to the invention, so that they can be used as parameters for timing or otherwise controlling of the Diesel engine.

Due to the fact that the trimming data of the injectors and other engine-specific calibration data will permanently and reliably remain in the read-only memory attached to the engine, from the time of production of the engine, the expensive and error-prone logistics needed heretofore for transmission of those data to an engine control unit are no longer required.

In addition to accommodating data to be used for engine control purposes, the read-only memory according to the invention is suited also for receiving other engine-specific data, especially engine identification data.

The engine-specific data of a Diesel engine can not only be stored in the read-only memory of a glow plug control device attached to the engine, but can alternatively be stored in an other device having a read-only memory which can form part of an integrated circuit (IC). The engine specific data can, for example, be stored in an IC which—as is disclosed in DE 101 17 809 A1—is located in the head of an injector of the Diesel engine, comprises parameter of the injector and is connected via an interface to an engine control unit which is able to access the injector parameters via said interface. The engine control unit is able to access the additionally stored engine-specific data via the same interface.

In case of an Otto engine the engine-specific data can be stored in a read-only memory, for example of an ignition module, which is mounted on the engine. An ignition module is an electronically controlled switching unit which serves for example to regulate the current, the voltage and the dwell angle for transistor ignition systems. It provides for reliable spark distribution in ignition systems with rotary high voltage distribution.

The attached single drawing shows a diagrammatic representation of the invention in the form of a block diagram: Mounted on an engine 2 is a control device 1, especially a glow plug control device 1 which contains a semiconductor-based read-only memory 1*a* in which engine-specific data are stored. The control device 1 and the engine 2 form together an assembly 3. An electronic engine control unit 5 is connected to an interface 6 of the control device 1 via communication lines 4. The engine-specific data contained in the read-only memory 1*a* of the control device 1 can be read out and transmitted to the engine control unit 5 via the communication lines 4.

The invention claimed is:

1. A device for vehicles comprising: an internal combustion engine for vehicles on which a control device is mounted having a semiconductor-based read-only memory, which contains first data which are used for controlling the active operation of the engine or of a part thereof, and comprising an interface enabling an access to the read-only memory, characterized in that in addition to the first data which are used by the control device for controlling said operation, second data being specific for the individual engine and containing a serial number identifying the engine, are stored in non-volatile manner in the control device, the said engine-specific second data being neither necessary nor used by the control device for actively controlling said operation of the engine or of a part thereof, and can be read out electronically via the said interface.

2. The engine as defined in claim 1, in which the engine-specific data are stored in the same read-only memory containing the data which are destined to be used for the given purpose of said control device.

3. The engine as defined in claim 1, the engine being a Diesel engine comprising glow plugs and characterized in that the read-only memory is part of the control device, and that the control device controls the operation of the glow plugs of the Diesel engine.

4. The engine as defined in claim 1, in which the engine-specific calibration data are used by an engine control unit provided for engine control purposes and provided separately from said control device in a vehicle driven by said engine, and in which the read-only memory is provided with an interface for connecting the engine control unit to the read-only memory.

5. The engine as defined in claim 4, the engine being a common rail Diesel engine with injectors and the engine-specific data being trimming data of the injectors.

6. A device mounted on an internal combustion engine for vehicles, the device having a given purpose and comprising a semiconductor-based read-only memory in which there are stored first data which are used for said given purpose and can be read out electronically via an interface, said read-only memory additionally stores in non-volatile manner second data, which are specific for the individual engine and include a serial number identifying the engine or parts thereof and which are neither required nor destined by said device for said given purpose, said device being connected to a separate control unit which has access to the engine-specific second data stored in the read-only memory of said device.

7. A control device for controlling the operation of an internal combustion engine) for vehicles or of a part thereof, the control device being mounted on said engine and comprising a semiconductor-based read-only memory in which there are stored first data which are used for controlling said operation of the engine or of parts thereof and can be read out electronically via an interface, said read-only memory additionally stores in non-volatile manner second data, which are specific for the individual engine and include a serial number identifying the engine or parts thereof and which are neither required nor destined by the control device for controlling said operation of the engine or of parts thereof.

8. The control device as defined in claim 7 connected to a separate control unit which has access to the engine-specific second data stored in the read-only memory of said control device.

9. A Diesel engine for vehicles on which a semiconductor-based read-only memory is mounted, which contains data which are specific for the individual engine and include a serial number identifying the engine or parts thereof and which comprises an interface through which said engine-specific data can be read out electronically characterized in that the read-only memory is part of a control device for the operation of glow plugs of the Diesel engine.

10. The engine as defined in claim 9, characterized in that the engine-specific data are a serial number and/or identification data identifying the engine or parts thereof.

11. A Diesel engine for vehicles on which a semiconductor-based read-only memory is mounted, which contains data which are specific for the individual engine, comprising trimming data, calibration data, serial number, and/or identification data identifying the engine or parts thereof and which comprises an interface through which said engine-specific data can be read out electronically, characterized in that said engine-specific data are calibration data that are used by an engine control unit provided for controlling the operation of the engine or of parts thereof, and characterized in that the read-only memory is provided with an interface connecting the engine control unit to the read-only memory.

12. The engine as defined in claim 11, which is a common rail Diesel engine with injectors and characterized in that said engine-specific data are trimming data of the injectors.

13. A control device for controlling the operation of an internal combustion engine for vehicles and mounted on said engine, comprising a semiconductor-based read-only memory in which data are stored which are specific for the individual engine including a serial number identifying the engine or parts thereof and further comprising an interface through which said engine-specific data stored in said control device can be read out electronically.

14. The control device as defined in claim 13 connected to a separate control unit having access to said engine-specific data stored in said read-only memory of said control device via said interface.

* * * * *